United States Patent
Bordia et al.

(10) Patent No.: US 11,842,062 B2
(45) Date of Patent: Dec. 12, 2023

(54) METHOD OF HANDLING IRREGULAR METABLOCK WEAR LEVELING AND UGSD BOOT TIME IMPROVEMENT

(71) Applicant: Western Digital Technologies, Inc., San Jose, CA (US)

(72) Inventors: Kalpit Bordia, Bengaluru (IN); Vinayak Bhat, Bengaluru (IN); Raghavendra Gopalakrishnan, Bengaluru (IN)

(73) Assignee: Western Digital Technologies, Inc., San Jose, CA (US)

( * ) Notice: Subject to any disclaimer, the term of this patent is extended or adjusted under 35 U.S.C. 154(b) by 65 days.

(21) Appl. No.: 17/650,490

(22) Filed: Feb. 9, 2022

(65) Prior Publication Data
US 2023/0251788 A1     Aug. 10, 2023

(51) Int. Cl.
*G06F 3/06*          (2006.01)

(52) U.S. Cl.
CPC .......... *G06F 3/064* (2013.01); *G06F 3/0604* (2013.01); *G06F 3/0679* (2013.01); *G06F 3/0644* (2013.01)

(58) Field of Classification Search
CPC ...... G06F 3/064; G06F 3/0604; G06F 3/0679; G06F 3/0644
See application file for complete search history.

(56) References Cited

U.S. PATENT DOCUMENTS

| | | | |
|---|---|---|---|
| 6,985,992 B1 | 1/2006 | Chang et al. | |
| 7,552,272 B2 | 6/2009 | Gonzalez et al. | |
| 7,631,138 B2 | 12/2009 | Gonzalez et al. | |
| 8,051,257 B2 | 11/2011 | Gorobets et al. | |
| 9,626,289 B2 | 4/2017 | Chen et al. | |
| 10,990,320 B2 | 4/2021 | Gola et al. | |
| 2005/0144357 A1* | 6/2005 | Sinclair | G06F 12/0246 711/E12.008 |
| 2007/0101095 A1* | 5/2007 | Gorobets | G06F 12/0246 711/E12.008 |
| 2008/0091871 A1* | 4/2008 | Bennett | G06F 12/0246 711/E12.008 |
| 2010/0172180 A1* | 7/2010 | Paley | G06F 12/0246 365/185.11 |
| 2016/0062881 A1* | 3/2016 | Chen | G06F 12/0246 711/103 |
| 2018/0366210 A1* | 12/2018 | Park | G06F 11/1048 |
| 2020/0133838 A1* | 4/2020 | Park | G06F 11/073 |
| 2020/0409860 A1* | 12/2020 | Muthiah | G06F 9/44505 |
| 2021/0124502 A1* | 4/2021 | Elyasi | G06F 3/0659 |
| 2022/0004336 A1* | 1/2022 | Naghate | G11C 16/32 |

* cited by examiner

*Primary Examiner* — Francisco A Grullon
(74) *Attorney, Agent, or Firm* — PATTERSON + SHERIDAN, LLP; Steven H. VerSteeg (57) ABSTRACT

The present disclosure generally relates to using irregular MetaBlocks (IRMBs) in both host and control pools. The IRMBs are used to ensure efficient wear leveling. Blocks in the control pool are swapped with blocks in the host pool upon exceeding a program-erase count (PEC) threshold. Additionally, the swapping algorithm for IRMBs can be used to ensure an efficient recovery from an ungraceful shutdown (UGSD) event.

20 Claims, 8 Drawing Sheets

FIG. 1

| TABLE 1 | FIM0 | FIM1 | FIM2 | FIM3 | | Control Blocks with IRMB | FIM0 | FIM1 | FIM2 | FIM3 |
|---|---|---|---|---|---|---|---|---|---|---|
| Host Pool | BLOCK 0 | BLOCK 0 | BLOCK 0 | BLOCK 0 | | | BLOCK 26 | BLOCK 26 | BLOCK 26 | BLOCK 26 |
| | BLOCK 1 | BLOCK 1 | BLOCK 1 | BLOCK 1 | | Meta Block 0 | BLOCK 27 | BLOCK 27 | BLOCK 27 | BLOCK 27 |
| | BLOCK 2 | BLOCK 2 | BLOCK 2 | BLOCK 2 | | Meta Block 1 | BLOCK 28 | BLOCK 28 | BLOCK 28 | BLOCK 28 |
| | BLOCK 3 | BLOCK 3 | BLOCK 3 | BLOCK 3 | | Meta Block 2 | BLOCK 29 | BLOCK 29 | BLOCK 29 | F0B31 |
| | BLOCK 4 | BLOCK 4 | BLOCK 4 | BLOCK 4 | | Meta Block 3 | BLOCK 30 | F0B32 | BLOCK 30 | F2B31 |
| | BLOCK 5 | BLOCK 5 | BLOCK 5 | BLOCK 5 | | Meta Block 4 | | | | |
| | BLOCK 6 | BLOCK 6 | BLOCK 6 | BLOCK 6 | | | | | | |
| | BLOCK 7 | BLOCK 7 | BLOCK 7 | BLOCK 7 | | | | | | |
| | BLOCK 8 | BLOCK 8 | BLOCK 8 | BLOCK 8 | | | TABLE 2 | | | |
| | BLOCK 9 | BLOCK 9 | BLOCK 9 | BLOCK 9 | | | | | | |
| | BLOCK 10 | BLOCK 10 | BLOCK 10 | BLOCK 10 | | | | | | |
| | BLOCK 11 | BLOCK 11 | BLOCK 11 | BLOCK 11 | | | | | | |
| | ... | ... | ... | ... | | | | | | |
| | BLOCK 25 | BLOCK 25 | BLOCK 25 | BLOCK 25 | | | | | | |
| | BLOCK 26 | BLOCK 26 | BLOCK 26 | BLOCK 26 | | | | | | |
| | BLOCK 27 | BLOCK 27 | BLOCK 27 | BLOCK 27 | | | | | | |
| | BLOCK 28 | BLOCK 28 | BLOCK 28 | BLOCK 28 | | | | | | |
| | BLOCK 29 | BLOCK 29 | BLOCK 29 | | | | | | | |
| Control Pool | BLOCK 30 | BLOCK 30 | BLOCK 30 | | | | | | | |
| (consider 5 control blocks required) | BLOCK 31 | BLOCK 31 | | | | | | | | |
| | BLOCK 32 | | | | | | | | | |

TABLE 1

| Host Pool | FIM0 | PEC | FIM1 | PEC | FIM2 | PEC | FIM3 | PEC |
|---|---|---|---|---|---|---|---|---|
| Meta Block 0 | BLOCK 0 | 350 | BLOCK 0 | 350 | BLOCK 0 | 350 | BLOCK 0 | 350 |
| Meta Block 1 | BLOCK 1 | 233 | BLOCK 1 | 233 | BLOCK 1 | 233 | BLOCK 1 | 233 |
| Meta Block 2 | BLOCK 2 | 231 | BLOCK 2 | 231 | BLOCK 2 | 231 | BLOCK 2 | 231 |
| Meta Block 3 | BLOCK 3 | 230 | BLOCK 3 | 230 | BLOCK 3 | 230 | BLOCK 3 | 230 |
| Meta Block 4 | BLOCK 4 | 217 | BLOCK 4 | 217 | BLOCK 4 | 217 | BLOCK 4 | 217 |
| Meta Block 5 | BLOCK 5 | 205 | BLOCK 5 | 205 | BLOCK 5 | 205 | BLOCK 5 | 205 |
| Meta Block 6 | BLOCK 6 | 198 | BLOCK 6 | 198 | BLOCK 6 | 198 | BLOCK 6 | 198 |
| Meta Block 7 | BLOCK 7 | 189 | BLOCK 7 | 189 | BLOCK 7 | 189 | BLOCK 7 | 189 |
| Meta Block 8 | BLOCK 8 | 180 | BLOCK 8 | 180 | BLOCK 8 | 180 | BLOCK 8 | 180 |
| Meta Block 9 | BLOCK 9 | 171 | BLOCK 9 | 171 | BLOCK 9 | 171 | BLOCK 9 | 171 |
| Meta Block 10 | BLOCK 10 | 162 | BLOCK 10 | 162 | BLOCK 10 | 162 | BLOCK 10 | 162 |
| Meta Block 11 | BLOCK 11 | 153 | BLOCK 11 | 153 | BLOCK 11 | 153 | BLOCK 11 | 153 |
| ... | | | | | | | | |
| Meta Block 25 | BLOCK 25 | 150 | BLOCK 25 | 150 | BLOCK 25 | 150 | BLOCK 25 | 150 |
| Control Pool | BLOCK 26 | 50 | BLOCK 26 | 50 | BLOCK 26 | 50 | BLOCK 26 | 50 |
| (consider 5 control blocks required) | BLOCK 27 | 49 | BLOCK 27 | 49 | BLOCK 27 | 49 | BLOCK 27 | 49 |
| | BLOCK 28 | 47 | BLOCK 28 | 47 | BLOCK 28 | 47 | BLOCK 28 | 47 |
| | BLOCK 29 | 47 | BLOCK 29 | 47 | BLOCK 29 | 47 | | |
| | BLOCK 30 | 45 | | | BLOCK 30 | 45 | | |
| | BLOCK 31 | 47 | | | BLOCK 31 | 45 | | |
| | BLOCK 32 | 45 | | | | | | |

TABLE 2

| Control Blocks with IRMB | FIM0 | FIM1 | FIM2 | FIM3 |
|---|---|---|---|---|
| Meta Block 0 | BLOCK 26 | BLOCK 26 | BLOCK 26 | BLOCK 26 |
| Meta Block 1 | BLOCK 27 | BLOCK 27 | BLOCK 27 | BLOCK 27 |
| Meta Block 2 | BLOCK 28 | BLOCK 28 | BLOCK 28 | BLOCK 28 |
| Meta Block 3 | BLOCK 29 | BLOCK 29 | BLOCK 29 | F0B31 |
| Meta Block 4 | BLOCK 30 | F0B32 | BLOCK 30 | F2B31 |

FIG. 4

TABLE 1

| Host Pool | FIM0 | PEC | FIM1 | PEC | FIM2 | PEC | FIM3 | PEC |
|---|---|---|---|---|---|---|---|---|
| MBn | BLOCK 26 | 50 | BLOCK 26 | 50 | BLOCK 26 | 50 | BLOCK 26 | 50 |
| MBn+1 | BLOCK 27 | 49 | BLOCK 27 | 49 | BLOCK 27 | 49 | BLOCK 27 | 49 |
| MBn+2 | BLOCK 28 | 47 | BLOCK 28 | 47 | BLOCK 28 | 47 | BLOCK 28 | 47 |
| MBn+3 | BLOCK 22 | 151 | BLOCK 25 | 150 | BLOCK 23 | 150 | BLOCK 23 | 230 |
| MBn+4 | BLOCK 23 | 151 | BLOCK 4 | 217 | BLOCK 24 | 217 | BLOCK 24 | 217 |
| MBn+5 | BLOCK 24 | 150 | BLOCK 5 | 205 | BLOCK 25 | 205 | BLOCK 25 | 205 |
| MBn+6 | BLOCK 25 | 150 | BLOCK 6 | 198 | BLOCK 6 | 198 | BLOCK 6 | 198 |
| MBn+7 | BLOCK 7 | 189 | BLOCK 7 | 189 | BLOCK 7 | 189 | BLOCK 7 | 189 |
| MBn+8 | BLOCK 8 | 180 | BLOCK 8 | 180 | BLOCK 8 | 180 | BLOCK 8 | 180 |
| MBn+9 | BLOCK 9 | 171 | BLOCK 9 | 171 | BLOCK 9 | 171 | BLOCK 9 | 171 |
| MBn+10 | BLOCK 10 | 162 | BLOCK 10 | 162 | BLOCK 10 | 162 | BLOCK 10 | 162 |
| MBn+11 | BLOCK 11 | 153 | BLOCK 11 | 153 | BLOCK 11 | 153 | BLOCK 11 | 153 |
| ... | ... | | ... | | ... | | ... | |
| MBn+22 | BLOCK 29 | 47 | BLOCK 23 | 151 | BLOCK 22 | 151 | BLOCK 22 | 151 |
| MBn+23 | BLOCK 30 | 45 | BLOCK 24 | 47 | BLOCK 29 | 151 | BLOCK 23 | 151 |
| MBn+24 | BLOCK 31 | 47 | BLOCK 25 | 45 | BLOCK 30 | 150 | BLOCK 24 | 150 |
| MBn+25 | BLOCK 32 | 45 | BLOCK 29 | 45 | BLOCK 31 | 47 | BLOCK 28 | 150 |
| Control Pool | BLOCK 0 | 350 | BLOCK 0 | 350 | BLOCK 0 | 350 | BLOCK 0 | 350 |
| (consider 5 control blocks required) | BLOCK 1 | 233 | BLOCK 1 | 233 | BLOCK 1 | 233 | BLOCK 1 | 233 |
| | BLOCK 2 | 231 | BLOCK 2 | 231 | BLOCK 2 | 231 | BLOCK 2 | 231 |
| | BLOCK 3 | 230 | BLOCK 3 | 230 | BLOCK 3 | 230 | | |
| | BLOCK 4 | 217 | | | BLOCK 4 | 217 | | |
| | BLOCK 5 | 205 | | | BLOCK 5 | 205 | | |
| | BLOCK 6 | 198 | | | | | | |

TABLE 2

| Control Blocks with IRMB | FIM0 | FIM1 | FIM2 | FIM3 |
|---|---|---|---|---|
| Meta Block 0 | BLOCK 0 | BLOCK 0 | BLOCK 0 | BLOCK 0 |
| Meta Block 1 | BLOCK 1 | BLOCK 1 | BLOCK 1 | BLOCK 1 |
| Meta Block 2 | BLOCK 2 | BLOCK 2 | BLOCK 2 | BLOCK 2 |
| Meta Block 3 | BLOCK 3 | BLOCK 3 | BLOCK 3 | F0B5 |
| Meta Block 4 | BLOCK 4 | F0B6 | BLOCK 4 | F2B5 |

FIG. 5

| Control Blocks with IRMB | FIM0 | FIM1 | FIM2 | FIM3 | |
|---|---|---|---|---|---|
| Meta BLOCK 0 | BLOCK 0 | BLOCK 0 | BLOCK 0 | BLOCK 0 | Allocated and Closed |
| Meta BLOCK 1 | BLOCK 1 | BLOCK 1 | BLOCK 1 | BLOCK 1 | Allocated and Closed |
| Meta BLOCK 2 | BLOCK 2 | BLOCK 2 | BLOCK 2 | BLOCK 2 | Unallocated |
| Meta BLOCK 3 | BLOCK 3 | BLOCK 3 | BLOCK 3 | F0B5 | Unallocated |
| | | | | | |
| | | | | | |
| Meta Block 4 | BLOCK 4 | F0B6 | BLOCK 4 | F2B5 | Open and being written when UGSD occurs |
| Status | Write Abort | No WA | Write Abort | No WA | |
| Recovery | | | | | |
| Meta Block 3 -> New composition | BLOCK 4 | BLOCK 3 | BLOCK 4 | F0B5 | Block 4 FIM0/FIM2 is copied to Block 3 of FIM0/FIM2 and then FlashFilled |
| Meta Block 4 -> New composition | BLOCK 3 | F0B6 | BLOCK 3 | F2B5 | |

METHOD OF HANDLING IRREGULAR METABLOCK WEAR LEVELING AND UGSD BOOT TIME IMPROVEMENT

BACKGROUND OF THE DISCLOSURE

Field of the Disclosure

Embodiments of the present disclosure generally relate to irregular MetaBlocks (IRMBs) in Solid-State Memory Devices (SSD).

Description of the Related Art

Irregular MetaBlock (IRMB) is a yield improvement mechanism. In data storage devices, regular MetaBlocks are formed using one die block from each flash interface module (FIM), which ensures that all FIMs work in parallel and provide high performance during writes and/or reads. In an IRMB, the data storage device considers more than one die block from the same FIM to allow for easing the criteria for maximum factory marked bad blocks (FBB) per die while maintaining the same average FBB across the device.

There are two ways to use IRMB for either the host block or for the control block. When used for the host block, the IRMB can have a negative impact upon the host write/read performance. Due to the negative impact upon host performance, IRMB usage in the control blocks is beneficial because writing in the control block is scarce and mainly die-page writes as opposed to meta-page writes.

Using IRMB for control blocks results in an unfortunate side-effect, where the program-erase count (PEC) for a single level cell (SLC) host pool may start deviating from the SLC control pool by a good margin and hence, challenges arise with both endurance in the host block pool due to higher PEC and wear level challenges in the SLC control pool.

Therefore, there is a need in the art to utilize IRMB while balancing wear leveling in both control and host pools.

SUMMARY OF THE DISCLOSURE

The present disclosure generally relates to using irregular MetaBlocks (IRMBs) in both host and control pools. The IRMBs are used to ensure efficient wear leveling. Blocks in the control pool are swapped with blocks in the host pool upon exceeding a program-erase count (PEC) threshold. Additionally, the swapping algorithm for IRMBs can be used to ensure an efficient recovery from an ungraceful shutdown (UGSD) event.

In one embodiment, a data storage device comprises: a memory device; and a controller coupled to the memory device, the controller configured to: arrange one or more host pools comprising a first plurality of MetaBlocks, wherein each MetaBlock of the first plurality comprises at least two blocks; arrange one or more control pools comprising a second plurality of MetaBlocks, wherein each MetaBlock of the second plurality comprises at least two blocks, wherein at least one MetaBlock of the control pool is an irregular MetaBlock (IRMB); and swap one or more blocks from the control pool with one or more blocks of the host pool to create a new MetaBlock.

In another embodiment, a data storage device comprises: a memory device; and a controller coupled to the memory device, the controller configured to: detect that an ungraceful shutdown (UGSD) has occurred; determine that a first irregular MetaBlock (IRMB) experienced a write abort during the UGSD, wherein less than all blocks of the first IRMB experienced the write abort; create a second IRMB, wherein the second IRMB comprises blocks that experienced the write abort and blocks that are unallocated; and create a third IRMB, wherein the third IRMB comprises remaining blocks from the first IRMB and additional unallocated blocks.

In another embodiment, a data storage device comprises: memory means; and a controller coupled to the memory means, the controller configured to: dynamically create irregular MetaBlocks (IRMBs) using blocks from one or more IRMBs in a control pool based upon a program-erase count (PEC) difference between a host pool and the control pool.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 4 is a schematic illustration of a device with program-erase count (PEC) imbalance between a SLC host and SLC control pool according to one embodiment.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to using irregular MetaBlocks (IRMBs) in both host and control pools. The IRMBs are used to ensure efficient wear leveling. Blocks in the control pool are swapped with blocks in the host pool upon exceeding a program-erase count (PEC) threshold. Additionally, the swapping algorithm for IRMBs can be used to ensure an efficient recovery from an ungraceful shutdown (UGSD) event.

Figure 1:
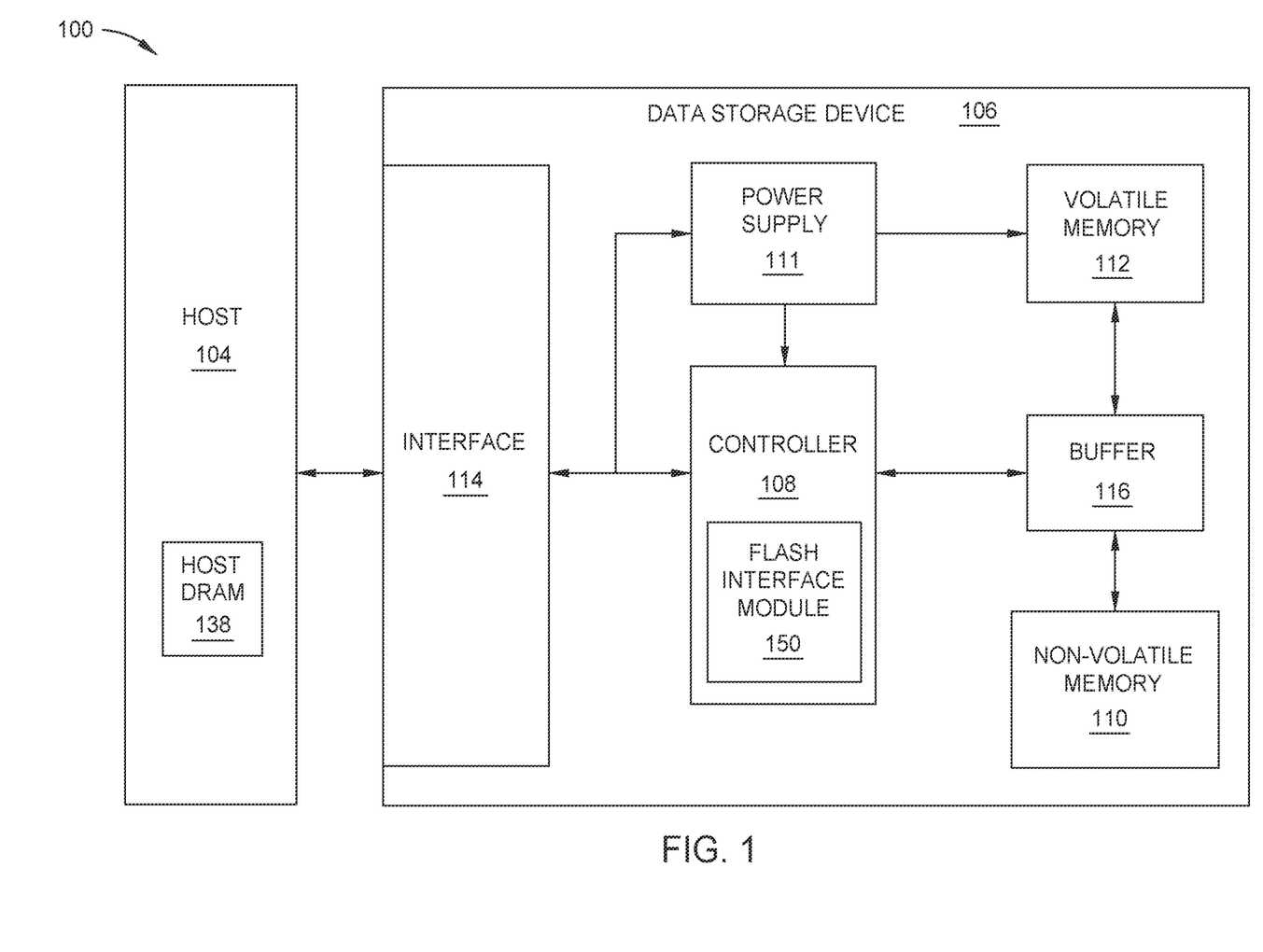
FIG. 1 is a schematic block diagram illustrating a storage system in which a data storage device may function as a storage device for a host device, according to certain embodiments.

FIG. 1 is a schematic block diagram illustrating a storage system 100 in which a host device 104 is in communication with a data storage device 106, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, the interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106, or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store the at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

Controller 108 includes a flash interface module (FIM) 150, where the FIM 150 is responsible for all communications to NAND packages. In some embodiments, a flash transition layer (FTL) may be coupled to the controller 108 and the FIM 150 is external to the controller 108. FTL is a module (e.g., component) that deals with bookkeeping and allocation of superblocks (SBs) of the NVM 110 to one or more zones. A SB is a set of blocks, which may be one or more blocks, of each die of a memory device of the NVM 110. It is contemplated that a SB may be formed by selecting one or more blocks from an available set of dies of the memory device, which may be a number of dies up to the total number of dies of the memory device. FTL further maintains a list of a free SBs across the NVM 110. When a zone, as described in FIGS. 2A and 2B, requests a SB, the FTL allocates a SB for the zone. In some examples, the FTL may open and close SBs.

Figure 2:
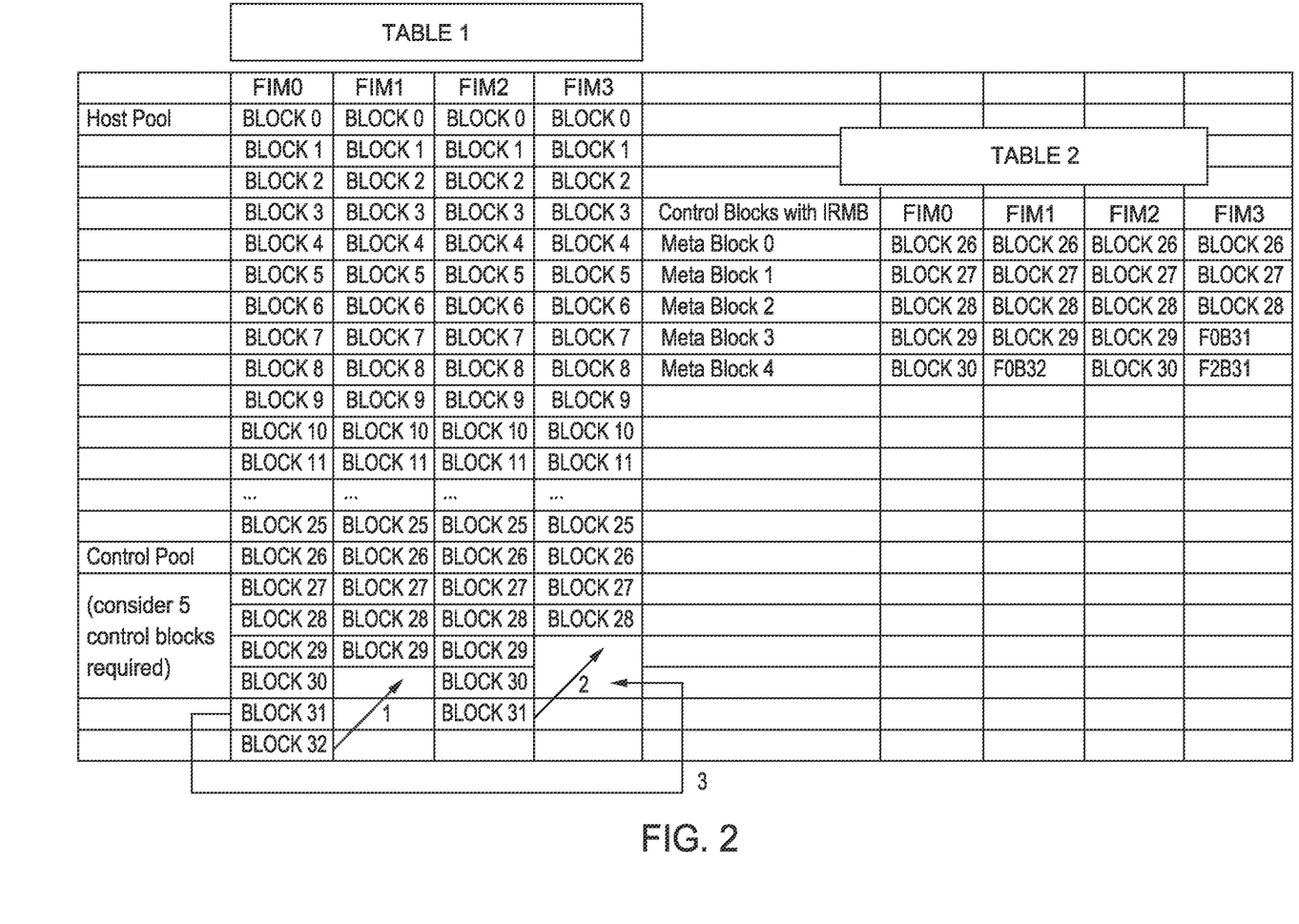
FIG. 2 is a schematic illustration of a storage device with IRMBs for control blocks.

FIG. 2 is a schematic illustration of a storage device with IRMBs for control blocks. The storage device may be the data storage device 106 of FIG. 1. The data storage device is a four die system, wherein the die comprises a host pool comprising 25 SLC blocks and a control pool comprising 5 SLC blocks. However, it is to be understood that the size of the host pool and the control pool may be larger or smaller depending on the embodiment. Four dies, FIM0-FIM3, work in parallel to ensure better performance benefit.

As illustrated in Table 1 of FIG. 2, each FIM may contain a different number of good and bad blocks. For example, here FIM0 contains blocks 26-32 (i.e. 7 good blocks), FIM1 contains blocks 26-29 (i.e. 4 good blocks), FIM2 contains blocks 26-31 (i.e. 6 good blocks), and FIM3 contains blocks 26-28 (i.e. 3 good blocks). Thus, FIM3, as shown in Table 1, lacks a Block 29 and hence a MetaBlock of blocks 29's from FIM0-FIM3 cannot be formed, and FIM1 and FIM3 lack a block 30 and hence a MetaBlock of blocks 30 from FIM0-FIM3 cannot be formed. Therefore, in order to form equally sized MetaBlocks across FIM0-FIM3 the spare good blocks from FIM0 (i.e blocks 31 and 32) and FIM2 (i.e. block 31) are moved into the open blocks of FIM1 and FIM3, thereby creating IRMBs.

For example, to create the IRMBs in the control pool, the last spare good block of the first FIM having an excess number of good blocks (here, block 32 of FIM0) is moved into the first open block of the first FIM lacking the required number of good blocks (here, the last open block of FIM1). This process is represented by arrow 1. A similar process may be repeated until all available spare good blocks have been moved into open blocks of FIMs lacking the required number of blocks. For example, as represented by arrow 2, on a second move, block 31 of FIM0 is now the first spare good block and there are two open blocks in FIM3. Thus, block 31 of FIM0 is moved into the first open block of FIM3. On a third move, as represented by arrow 3, block 31 of FIM2 is now the first spare good block and there is one open block in FIM3. Thus, block 31 of FIM2 is moved into the last open block of FIM3.

Table 2 of FIG. 2 illustrates MetaBlocks 0-4 of the control pool after a moving process. MetaBlock 0, a regular MetaBlock, comprises blocks 26's from FIM0-FIM3. MetaBlock 1, a regular MetaBlock, comprises blocks 27's from FIM0-FIM3. MetaBlock 2, a regular MetaBlock, comprises blocks 28's from FIM0-FIM3. MetaBlock 3, an IRMB, comprises blocks 29's from FIM0-FIM2 and block 31 from FIM0 (F0B31). MetaBlock 4, an IRMB, comprises blocks 30 from FIM0 and FIM2, block 32 of FIM0 (F0B32) and block 31 of FIM2 (F2B31).

Figure 3:
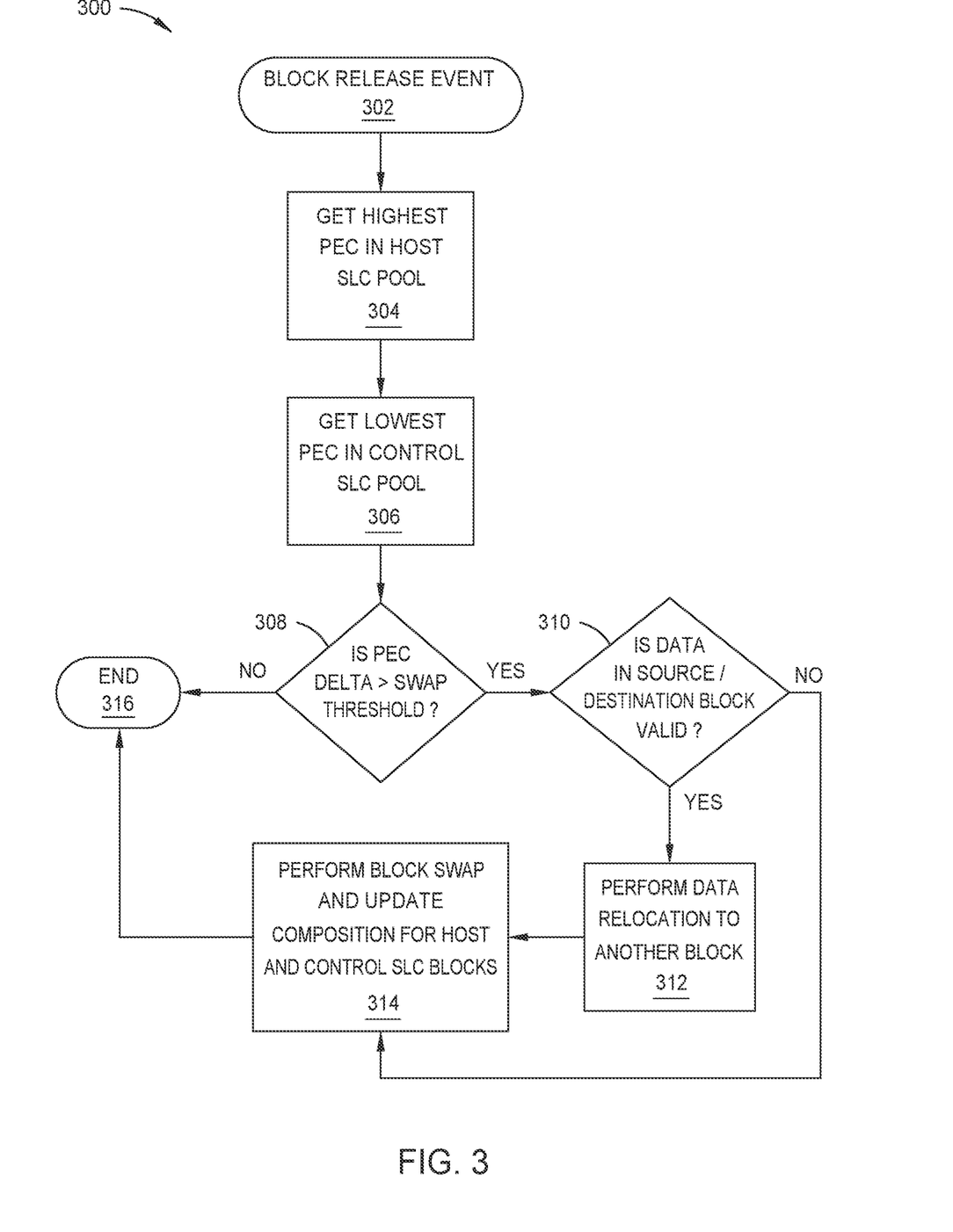
FIG. 3 is a flowchart illustrating a block swap flow during block release events via threshold checking according to one embodiment.

FIG. 3 is a flowchart 300 illustrating a block swap flow during block release events via threshold checking according to one embodiment. At 302, a block release event occurs. A block release event may be when a block has no valid content and is released to a pool of free blocks. At 304, a controller identifies a block from the host pool with the highest number of program-erase cycles (PEC). At 306, the controller identifies a block from the control pool with the lowest PEC. The controller may be the controller 108 of FIG. 1. At 308, the controller determines the delta PEC between the block from the host pool with the highest PEC and the block from the control pool with the lowest PEC, and determines if the delta PEC is greater than a swap threshold. If the delta PEC is not greater than the swap threshold, then no swap occurs and the process ends at 316. However, if the delta PEC is greater than the swap threshold, at 310 the controller determines a source block and a destination block for the swapping process, wherein the source block is the highest PEC block from the host pool and the destination block is the lowest PEC block from the control pool. During the swapping process, the source block is swapped with the destination block (i.e. the highest PEC block from the host pool is swapped with the lowest PEC block from the control pool). The controller further checks if the data from both the source block and the destination block is valid. If the data is valid, at 312, the controller relocates the data to another block. If the data is not valid, at 314, the controller performs a block swap and updates the composition for the host pool and control pool SLC blocks, completing the process. Alternatively, there can be cases, wherein the controller identifies that there exists more than one pair of source-destination blocks which satisfy the PEC difference greater than swap threshold criteria, in such cases the above mentioned swap process can be performed by selecting multiple source blocks and multiple destination blocks at once and the movement of blocks between the Host pool and Control pool can be in any PEC order as long as all the blocks satisfy the Swap threshold criteria, i.e. Source to Destination PEC different is greater than pre-defined threshold.

FIG. 4 is a schematic illustration of a storage device with a program-erase count (PEC) imbalance between a SLC host and SLC control pool according to one embodiment. Tables 1 and 2 of FIG. 4, illustrating a host pool and a control pool, are the same as Tables 1 and 2 of FIG. 2; however, now a PEC for each block of the host pool and the control pool are shown.

As illustrated, the blocks of the host pool have higher PEC values than the blocks of the control pool because the blocks of the host pool are more frequently written to and erased. As such, the PEC of the blocks from the host pool will increase faster than the PEC of the blocks from the control pool. Therefore, without swapping blocks between the control pool and the host pool, the PEC delta between the host pool and the control pool will continue to increase. In order to balance the wear leveling between the host pool and the control pool, blocks from the control pool, with relatively low PEC values compared to blocks in the host pool, are swapped with blocks from the host pool with relatively high PEC values compared to blocks in the control pool.

Figure 5:
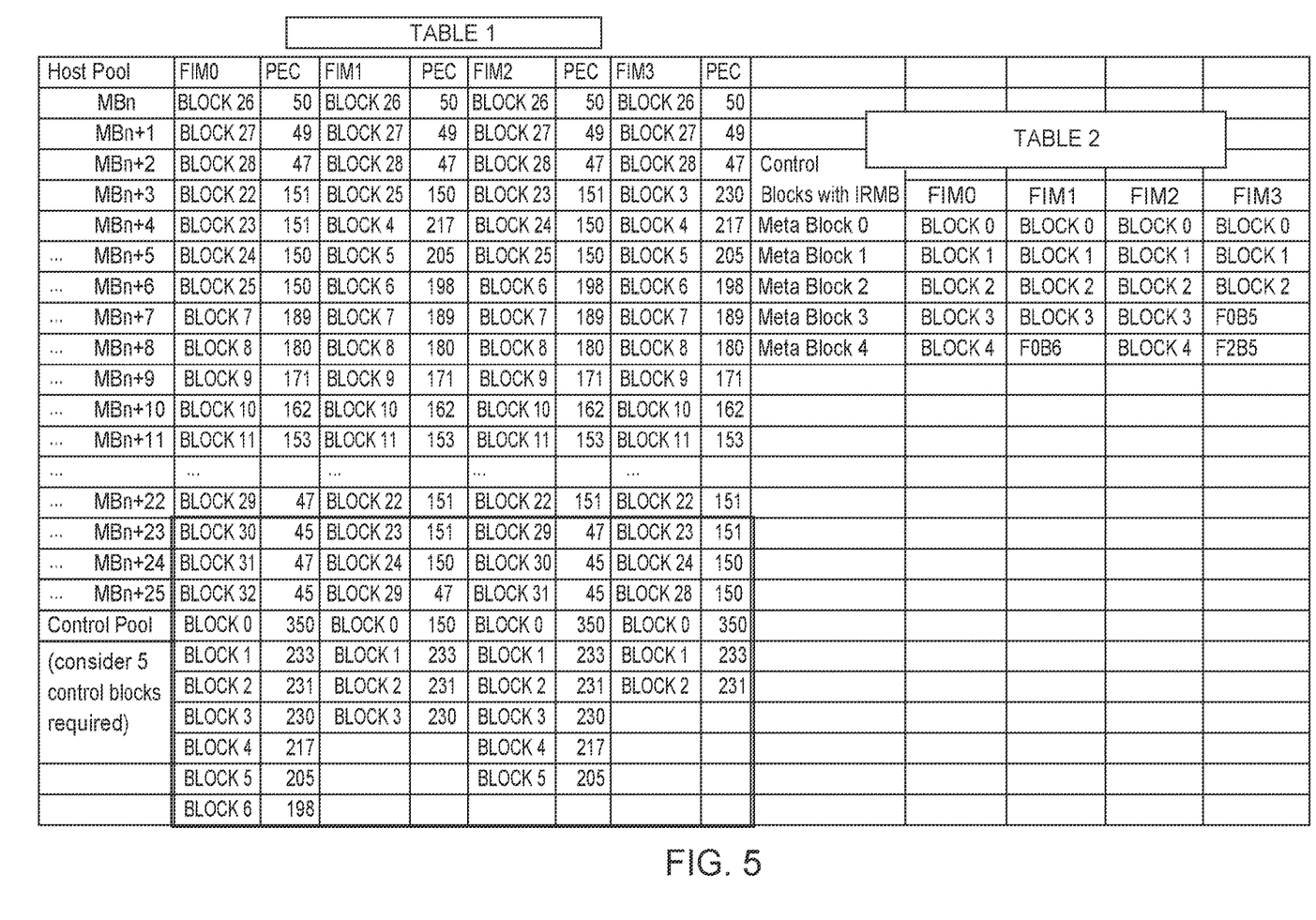
FIG. 5 is a schematic illustration of a swapping process based on endurance threshold to allow for efficient wear leveling between control and host pools according to one embodiment.

FIG. 5 is a schematic illustration of a swapping process based on an endurance threshold to allow for efficient wear leveling between a control pool and a host pool according to one embodiment. Table 1 of FIG. 5 illustrates a host pool, such as the host pool of FIG. 2 and FIG. 4, after a swapping process has taken place. Table 2 of FIG. 5 illustrates a control pool, such as the control pool of FIG. 2 and FIG. 4, after a swapping process has taken place.

In one embodiment, high PEC blocks from the host pool are directly swapped with low PEC blocks from the control pool. For example, all eligible low PEC blocks from FIM0 of the control pool (i.e. blocks 26-32 of FIM0) are swapped with all eligible high PEC blocks from FIM0 of the host pool (i.e. blocks 0-6 of FIM0). This process is completed across dies FIM1-FIM3 so that FIM1 of the host pool comprises blocks 26-29 and blocks 4-25 and FIM1 of the control pool comprises blocks 0-3, FIM2 of the host pool comprises blocks 26-31 and blocks 6-25 and FIM2 of the control pool comprises blocks 0-5, and FIM3 of the host pool comprises blocks 26-28 and blocks 3-25 and FIM3 while the control pool comprises blocks 0-2. Although blocks have been switched between the host pool and the control pool, no IRMBs have been formed in the host pool or the control pool because all blocks were swapped within the same FIM.

As such, Mbn-Mbn+3 of the host pool are MetaBlocks of blocks 26's-29's from FIM0-FIM3. Mbn+4 is a MetaBlock of blocks 29's from FIM0-FIM2, and block 3 from FIM3. Mbn+5 is a MetaBlock of blocks 30's from FIM0 and FIM2, and blocks 4's from FIM1 and FIM3. Mbn+6 is a MetaBlock of blocks 31's from FIM0 and FIM2, and blocks 5's from FIM1 and FIM3. Mbn+7 is a MetaBlock of block 32 from FIM0, and blocks 6's from FIM1-FIM3. Mbn+8-Mbn+25 are MetaBlocks of blocks 7's-25's from FIM0-FIM3.

However, after a direct swap each FIM may still contain a different number of blocks in the control pool. Thus, similar to the control pool illustrated in Table 2 of FIG. 2, FIM0 of the control pool has 7 blocks (blocks 0-6), FIM1 of the control pool has 4 blocks (blocks 0-3), FIM2 of the control pool has 6 blocks (blocks 0-5), and FIM3 has 3 blocks (blocks 0-2). Hence, within the control pool, only three regular MetaBlocks can be formed (i.e., MetaBlock 0-2). Therefore, in order to form equally sized MetaBlocks across FIM0-FIM3 the spare good blocks from FIM0 (i.e blocks 5 and 6) and FIM2 (i.e. block 5) are moved into the open blocks of FIM1 and FIM3, thereby creating IRMBs in the control pool (i.e., MetaBlocks 3 and 4).

Table 2 of FIG. 2 illustrates MetaBlocks 0-4 of the control pool after the blocks have been moved to create five equally sized MetaBlocks. MetaBlock 0, a regular MetaBlock, comprises blocks 0's from FIM0-FIM3. MetaBlock 1, a regular MetaBlock, comprises blocks 1's from FIM0-FIM3. Meta-Block 2, a regular MetaBlock, comprises blocks 2's from FIM0-FIM3. MetaBlock 3, an IRMB, comprises blocks 3's from FIM0-FIM2 and a block 5 from FIM0 (F0B5). Meta-Block 4, an IRMB, comprises blocks 4's from FIM0 and FIM2, block 6 from FIM0 (F0B6), and block 5 from FIM2 (F2B5).

Thus, the control pool is comprised of three regular MetaBlocks and 2 IRMBs. However, there is no irregularity introduced into the host pool because the blocks that were swapped between the host pool and the control pool were swapped within the same FIM. As such, the control pool contains the highest PEC blocks thereby reducing the PEC delta between the host pool and the control pool. However, wear leveling may still be unbalanced in a direct swapping process because one or more MetaBlocks of the host pool may contain blocks with significantly different PECs. Thus, to allow limited PEC difference within the MetaBlocks themselves, an indirect swapping process may be needed.

In another embodiment, an indirect swapping process is performed after a direct swapping process (i.e. a double swapping process is performed where the first swapping process is a direct swapping process and the second swapping process is an indirect swapping process that swaps blocks within the same FIM in the host pool, thereby rearranging the MetaBlocks). FIG. 5 Table 1 illustrates the composition of the host pool and the control pool after a double swapping process.

It is to be understood that while the present embodiment describes the direct swapping process as taking place "first," and the indirect swapping process as taking place "second," the direct swapping process and the indirect swapping process may occur simultaneously, in a different order, or in combination with additional swapping process described herein, and "first" and "second" are merely used to describe one possible embodiment.

As described above, a direct swapping process is performed where eligible low PEC blocks from the control pool from FIM0-FIM3 are directly swapped with eligible high PEC blocks from the host pool. Second, an indirect swapping process is performed. In an indirect swapping process, the lowest PEC block(s) of the control pool are swapped with the lowest PEC block(s) in the host pool, the lowest PEC block(s) in the host pool are swapped with the highest PEC block(s) in the host pool, and the highest PEC block(s) in the host pool are swapped with the lowest PEC block(s) in the control pool. A detailed explanation of the indirect swapping process is given below.

As described above, after a direct swapping process the configuration of the host pool is: the zeroth MetaBlock of the host pool which comprised blocks 0 from FIM0-FIM3 (see Table 1, FIG. 2) is now a MetaBlock of blocks 26's from FIM0-FIM3, the first MetaBlock of the host pool which comprised blocks 1 from FIM0-FIM3 (see Table 1, FIG. 2) is now a MetaBlock of blocks 27's from FIM0-FIM3, and the second MetaBlock of the host pool which comprised blocks 2's from FIM0-FIM3 (see Table 1, FIG. 2) is now a MetaBlock of blocks 28's from FIM0-FIM3.

As described above, after a direct swapping process the configuration of the host pool is: MetaBlock 26 of the control pool which comprised blocks 26's from FIM0-FIM3 (see FIG. 4) is now a MetaBlock of blocks 0's from FIM0-FIM3, MetaBlock 27 of the control pool which comprised blocks 27's from FIM0-FIM3 (See Table 1, FIG. 4) is now a MetaBlock of blocks 1's from FIM0-FIM3, and MetaBlock 28 which comprised blocks 28's from FIM0-FIM3 (see Table 1, FIG. 4) is now a MetaBlock of blocks 3's from FIM0-FIM3.

At this point there has been no irregularity introduced into either the host pool or the control pool. However, there are still high PEC blocks in the host pool resulting in uneven wear-leveling, but because there are no more control pool blocks from regular MetaBlocks to swap into the host pool, a second indirect swapping process is needed.

Second, in the indirect swapping process, the remaining eligible low PEC blocks from the control pool from FIM0-FIM3 are swapped with an equal amount of the eligible low PEC blocks from the host pool, the eligible low PEC blocks of the host pool are swapped with an equal amount of the eligible high PEC blocks of the host pool, and the eligible high PEC blocks of the host pool are swapped with an equal amount of the eligible low PEC blocks of the control pool. A block is eligible if the block contains valid data.

As such, with respect to FIM0, a double swap occurs where blocks 22-25 from the host pool are swapped with blocks 3-6 from the host pool, and blocks 3-6 from the host pool are swapped with blocks 29-32, which were from the control pool (see Table 1, FIG. 4) so that blocks 3-6 are now in the control pool. FIM0 of the host pool now comprises blocks 26-28 (which were previously directly swapped from the control pool into the host pool, see description above), blocks 22-25 (which were indirectly swapped from within the host pool), blocks 7-21 (which were not swapped), and blocks 29-32 (which were indirectly swapped from the control pool into the host pool). FIM0 of the control pool now comprises blocks 0-6, of which blocks 0-2 were directly swapped into the control pool from the host pool (see description above), and blocks 3-6 which were indirectly swapped from the host pool into the control pool.

With respect to FIM1, block 29, which was previously from the control pool (see Table 1, FIG. 4) is swapped with block 25 from the host pool (see Table 1, FIG. 4) so that block 29 is now in the host pool, block 25 from the host pool is swapped with block 3 of the host pool, and block 3, which was previously from the host pool (see Table 1, FIG. 4) is swapped with block 29, which was previously from the control pool (see Table 1, FIG. 4), so that block 3 is now in the control pool. FIM1 of the host pool now comprises blocks 26-28 (which were previously directly swapped from the control pool into the host pool, see description above), block 25 (which was indirectly swapped from within the host pool), blocks 4-21 (which were not swapped), and block 29 (which was indirectly swapped from the control pool into the host pool). FIM1 of the control pool now comprises blocks 0-3, of which blocks 0-2 were directly swapped into the control pool from the host pool (see description above), and block 3 which was indirectly swapped from the host pool into the control pool.

With respect to FIM2, blocks 29-31, which were previously from the control pool (see Table 1, FIG. 4) are swapped with blocks 23-25 from the host pool (see Table 1, FIG. 4) so that blocks 29-31 are now in the host pool, blocks 23-25 from the host pool are swapped with blocks 3-6 from the host pool, and blocks 3-5 from the host pool are swapped with blocks 29-31, which were from the control pool (see Table 1, FIG. 4) so that blocks 3-5 are now in the control pool. FIM2 of the host pool now comprises blocks 26-28 (which were previously directly swapped from the control pool into the host pool, see description above), blocks 23-25 (which were indirectly swapped from within the host pool), blocks 6-21 (which were not swapped), and blocks 29-31 (which were indirectly swapped from the control pool into the host pool). FIM2 of the control pool now comprises blocks 0-5, of which blocks 0-2 were directly swapped into the control pool from the host pool (see description above), and blocks 3-5 which were indirectly swapped from the host pool into the control pool.

With respect to FIM3, no indirect swapping process takes place because all eligible low PEC blocks from the control pool were directly swapped into the host pool. Therefore, as described above, FIM3 of the host pool comprises blocks 26-28 (which were directly swapped from the control pool into the host pool), and blocks 3-25 (which were not swapped). FIM3 of the control pool comprises blocks 0-2, which were directly swapped from the host pool into the control pool.

After the indirect swapping process is complete, as illustrated by Table 1, FIG. 5, the host pool still comprises regular MetaBlocks because the blocks swapped within the host pool are swapped within the same FIM; however, the MetaBlocks of the host pool are now rearranged. As such, MetaBlocks Mbn-Mbn+2 of the host pool are MetaBlocks of blocks 26's-28's from FIM0-FIM3. Mbn+3 is a MetaBlock of block 22 from FIM0, block 25 from FIM1, block 23 from FIM2, and block 3 from FIM3. Mbn+4 is a MetaBlock of block 23 from FIM0, blocks 4's from FIM1 and FIM3, and block 24 from FIM2. Mbn+5 is a MetaBlock of block 24 from FIM0, blocks 5's from FIM1 and FIM3, and block 25 from FIM2. Mbn+6 is a MetaBlock of block 25 from FIM0, and blocks 6's from FIM1-FIM3. Mbn+7-Mbn+21 are MetaBlocks of blocks 7's-21's from FIM0-FIM3. Mbn+22 is a MetaBlock of block 29 from FIM0, and blocks 22's from FIM1-FIM3. Mbn+23 is a MetaBlock of block 30 from FIM0, block 23's from FIM1 and FIM3, and block 29 from FIM2. Mbn+24 is a MetaBlock of block 31 from FIM0, blocks 24's from FIM1 and FIM3, and block 30 from FIM2. Mbn+25 is a MetaBlock of block 32 from FIM0, block 29 from FIM1, block 31 from FIM2, and block 25 from FIM3.

The benefit of indirect swapping is that by rearranging the MetaBlocks of the host pool, the PEC difference within the MetaBlocks themselves are limited. For example, prior to the second swap of the indirect swap (i.e. after only the direct swap) Mbn+4, as described above, is a MetaBlock of blocks 29's from FIM0-FIM2, and block 3 from FIM3. Blocks 4's from FIM0-FIM3 have a PEC of 217 and blocks 29's from FIM0-FIM3 have a PEC of 47. As such, the PEC difference within Mbn+4 after the direct swap is 170 (i.e.

217–47=170). However, after the double swap in the indirect swapping process Mbn+4, as described above, is now a MetaBlock of block 23 from FIM0, blocks 4's from FIM1 and FIM3, and block 24 from FIM2. Block 23 from FIM0-FIM3 has a PEC of 151, and block 24 from FIM0-FIM3 has a PEC of 150. As such, the PEC difference within Mbn+4 after the indirect swapping process is 67 (i.e. 217–150=67). Thus, it is clearly shown that after an indirect swapping process the PEC difference across a MetaBlock can be decreased, thereby improving wear leveling.

Turning to the control pool as illustrated in Table 1 of FIG. 5, it can be seen that each FIM contains a different number of blocks and similar to Table 1 of FIG. 2, equally sized MetaBlocks cannot be formed. Therefore, in order to form equally sized MetaBlocks across FIM0-FIM3 the spare blocks from FIM0 (i.e blocks 5 and 6) and FIM2 (i.e. block 5) are moved into the open blocks of FIM1 and FIM3, thereby creating IRMBs in the control pool.

Table 2 of FIG. 5 illustrates MetaBlocks 0-4 of the control pool after the blocks have been moved for create five equally sized MetaBlocks. MetaBlock 0, a regular MetaBlock, comprises blocks 0's from FIM0-FIM3. MetaBlock 1, a regular MetaBlock, comprises blocks 1's from FIM0-FIM3. MetaBlock 2, a regular MetaBlock, comprises blocks 2's from FIM0-FIM3. MetaBlock 3, an IRMB, comprises blocks 3's from FIM0-FIM2 and a block 5 from FIM0 (F0B5). MetaBlock 4, an IRMB, comprises blocks 4's from FIM0 and FIM2, block 6 from FIM0 (F0B6), and block 5 from FIM2 (F2B5).

As such, the control pool is now comprised of high PEC blocks and the host pool is comprised of low PEC blocks, thereby reducing the PEC delta between the host pool and the control pool. For example, the highest PEC block in the host pool is block 3 from FIM3 with a PEC of 250 and the lowest PEC block in the control pool is block 6 from FIM0 with a PEC of 198. Therefore, the PEC delta between the host pool and the control pool is 52 (250–198=52). Whereas, before the direct and indirect swapping processes, the PEC delta between the host pool and the control pool was 205 (see Table 1, FIG. 4 where the highest PEC block in the host pool was blocks 0's from FIM0-FIM3 and the lowest PEC block was block 32 from FIM0. Therefore, the PEC delta=350–45=205).

Although, the PEC delta between the host pool and the control pool has been greatly reduced, improving wear leveling and host write performance, further swapping within the host pool may improve wear leveling.

In another embodiment, additional intra-pool swapping process is performed in the host pool. An intra-pool swap is the same as the second swapping process of the indirect swapping process described above, where regular MetaBlocks of the host pool are further re-arranged to allow for limited PEC difference within a MetaBlock itself (i.e. no direct swap takes place and therefore a full indirect swapping process is not performed).

For example, as shown in FIG. 5, after an indirect swap, a MetaBlock 25 of the host pool comprises block 32 from FIM0 having a PEC of 45, block 29 from FIM1 having a PEC of 47, block 31 from FIM2 having a PEC of 45, and block 25 from FIM3 having a PEC of 150. The delta PEC across MetaBlock 25 is 105 (i.e. the highest PEC value of 150 from block 25 from FIM3—the lowest PEC value 45 from block 32 from FIM0 and block 31 from FIM1=105). Thus, even after the indirect swap, the delta PEC across MetaBlock 25 is unbalanced. Further direct or indirect swapping would not balance the PEC across the MetaBlock because the eligible blocks from the control poll all now have higher PECs than block 25 from FIM3. Therefore, intra-pool swapping is needed.

To balance the PEC across MetaBlock 25, block 25 from FIM3, having a PEC of 150, may be swapped with block 29 from FIM0, having a PEC of 47.

As such, MetaBlock 22 of the host pool now comprises block 25 of FIM3 and blocks 22's from FIM1-FIM3. Thus, the PEC delta across MetaBlock 22 is now 1 (i.e. the highest PEC value of 151 from blocks 22 from FIM1-FIM3—the lowest PEC value 150 from block 25 from FIM3=1). MetaBlock 25 now comprises blocks 29 from FIM0 and FIM1, block 31 from FIM2, and block 32 from FIM0. Thus, the PEC delta across MetaBlock 25 is now 2 (i.e. the highest PEC value of 47 from blocks 29's from FIM0 and FIM1—the lowest PEC value of 45 from blocks 32 from FIM0 and block 31 from FIM2=2). As such, the PEC delta across MetaBlock 22 and 25 have been reduced. It is to be understood that the intra-pool swap described above is merely an example of one possible intra-pool swap. The intra-pool swapping process may comprise multiple swaps, and/or different blocks may be swapped depending on the embodiment.

Intra-pool swapping may be used when the PEC difference within a MetaBlock itself starts to go beyond a certain threshold, such as a block swap threshold. For example, the PEC threshold beyond which there would be a system level impact is 1500 PEC delta. As such, there could be a threshold of 300 PEC for doing swaps (direct swap, indirect swaps, and/or intra-pool swaps). However, the thresholds for swapping must be designed considering the max allowed variations between the SLC blocks in the host pool and the SLC blocks of the control pool (i.e. the block swap threshold should be below the max PEC variation).

It is to be understood that a direct swapping process, an indirect swapping process, and/or an intra-pool swapping process may occur alone or in combination. It is to be further understood that although FIG. 5 does not illustrate every embodiment described herein, it is not to be considered to be limiting. FIG. 5 merely illustrates a snapshot of one or more embodiments of the swapping process described herein.

Figure 6:
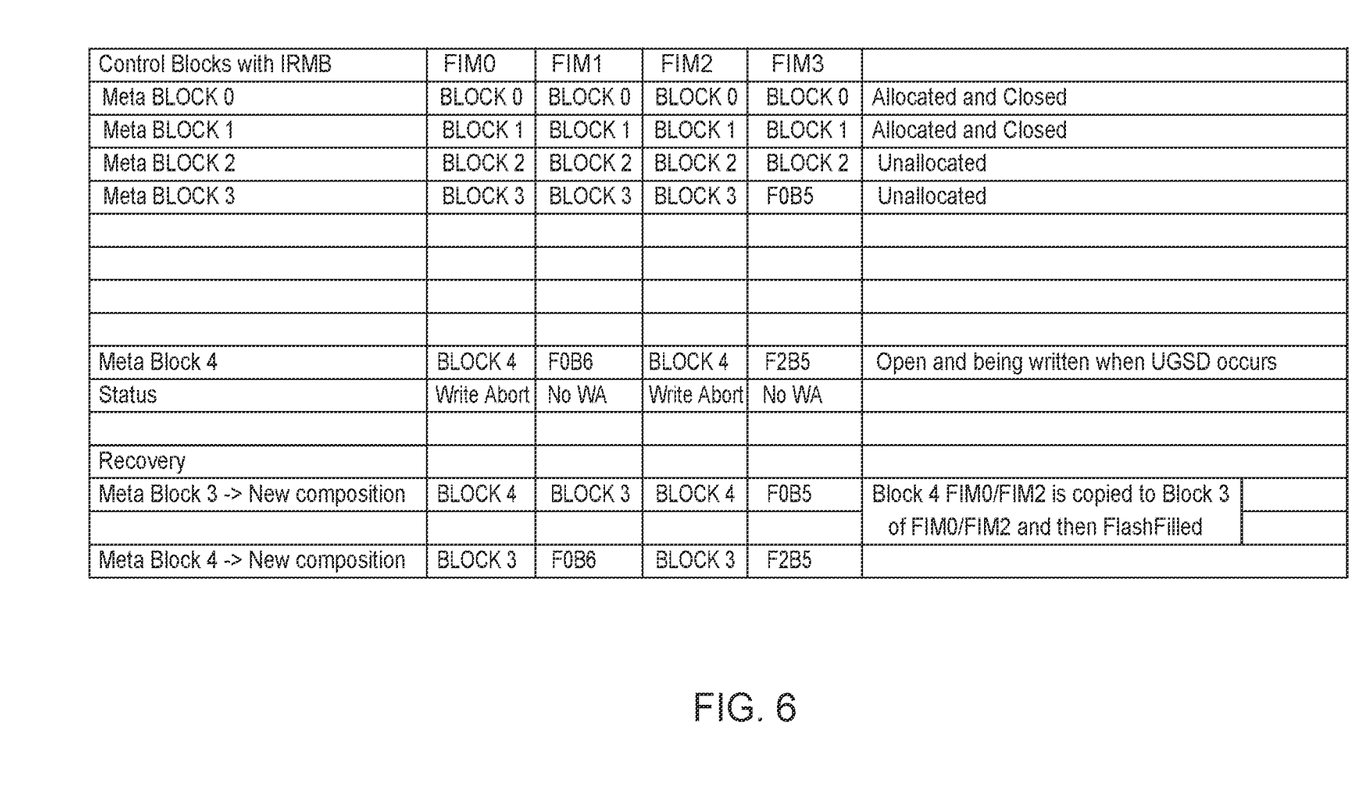
FIG. 6 is schematic illustration of ungraceful shutdown (UGSD) handling via die block swapping instead of recopying a full MetaBlock according to one embodiment.

FIG. 6 is schematic illustration of ungraceful shutdown (UGSD) handling via die block swapping instead of recopying a full MetaBlock according to one embodiment. In FIG. 6, MetaBlock 4 was the current open control block and during a write operation there was a USGD. Normally, during a USGD all the blocks of the MetaBlock are write aborted at the same time. However, here because MetaBlock 4 is an IRMB (i.e. MetaBlock 4 comprises blocks 4 from FIM0 and FIM2, block 6 from FIM0 (F0B6), and block 5 from FIM2 (F2B5)), the two replacement die-blocks (i.e. F0B6 and F2B5) do not undergo programing at the same instance as blocks 4's from FIM0 and FIM2. Therefore, blocks F0B6 and F2B5 are not write aborted at the same time and data may be lost in the UGSD.

In a conventional handling of an UGSD, a complete copy of a MetaBlock is made to another destination. However, this may result in unnecessary writes because there may be unallocated blocks that valid blocks can be swapped with, thereby reducing the number of blocks that need to be constituted after the UGSD. Thus, by using a block swap after the USGD, a complete copy of the MetaBlock is not necessary and avoids an extra die-block recovery and saves on mount time in case of a UGSD recovery.

For example, in the instance of an UGSD, instead of completely copying MetaBlock 4, blocks 4's from FIM0 and FIM2 are copied to unallocated blocks 3's from FIM0 and FIM2. As such, MetaBlock 3, an IRMB, now comprises blocks 4's from FIM0 and FIM2, block 3 of FIM1, and block 5 of FIM0 (F0B5), and MetaBlock 4, an IRMB, now comprises blocks 3's from FIM0 and FIM2, block 6 of FIM0 (F0B6), and block 5 of FIM2 (F2B5). The swapping is within the same FIM and also within the same pool. Therefore, when reconstituting the blocks after the UGSD only two MetaBlocks (MetaBlock 3 and MetaBlock 4) need to be recovered instead of the three MetaBlocks that would need to be reconstituted if MetaBlock 4 was completely copied to another MetaBlock (i.e. MetaBlock 3 which is unallocated would be reconstituted, MetaBlock 4 would be reconstituted, albeit unsuccessfully because of its IRMB nature, and the copy of MetaBlock 4 would be reconstituted). This saves on mount time in case of a UGSD recovery because less blocks have to be reconstituted.

Figure 7:
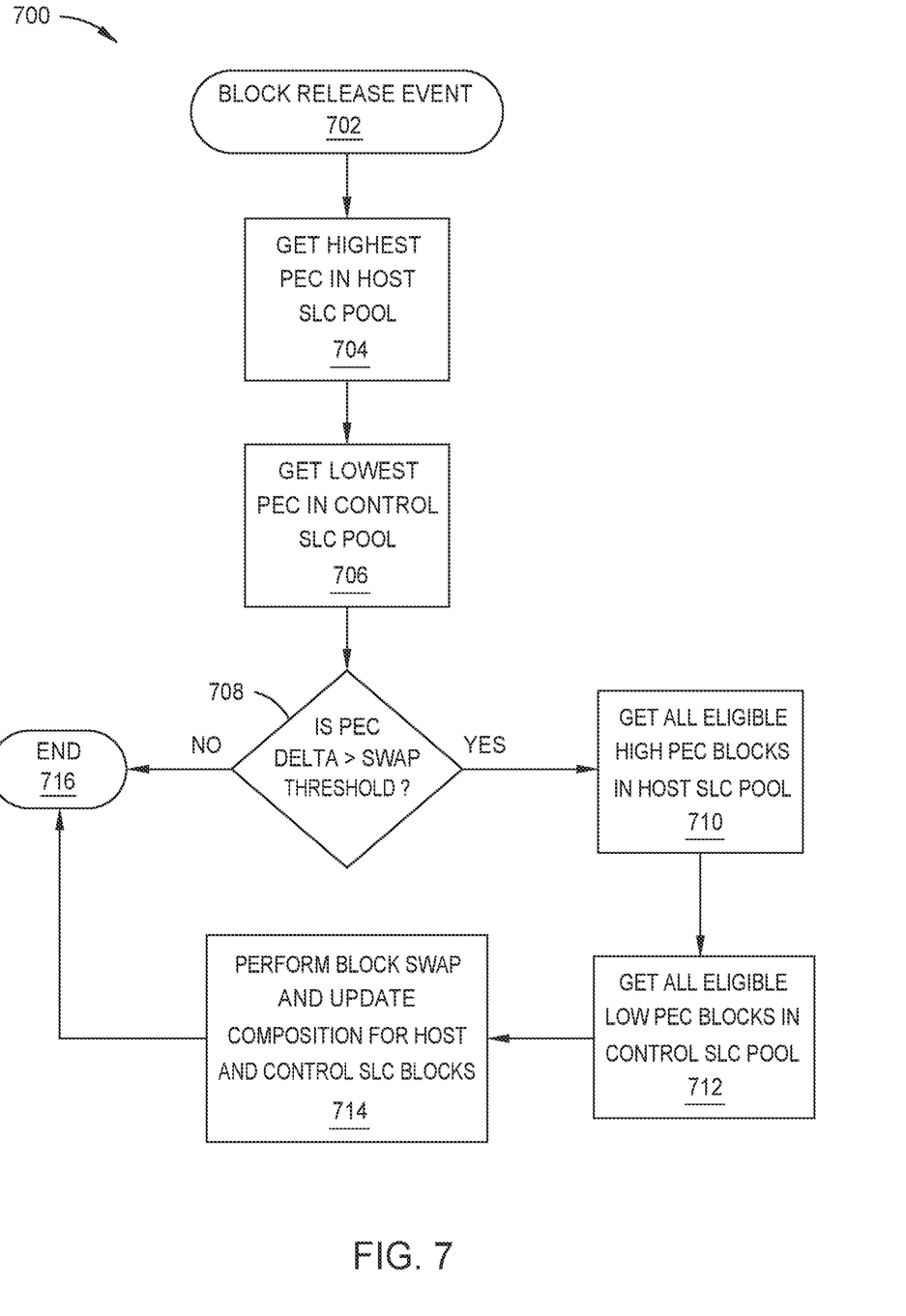
FIG. 7 is a flowchart illustrating a direct swapping process according to one embodiment.

FIG. 7 is a flowchart 700 illustrating a direct swapping process according to one embodiment. At 702, a block release event occurs. A block release event may be when a block(s) has no valid content and is released to a pool of free blocks. At 704, a controller identifies a block from the host pool with the highest PEC. At 706, the controller identifies a block from the control pool with the lowest PEC. The controller may be the controller 108 of FIG. 1. At 708, the controller determines if the PEC delta between the block having the highest PEC in the host SLC pool and the block having the lowest PEC in the control SLC pool is greater than a swap threshold. If the PEC delta is not greater than the swap threshold, then no swap occurs and the process ends at 716. However, if the PEC delta is greater than the swap threshold, at 710 the controller identifies all eligible high PEC block(s) in the host SLC pool. At 712, the controller identifies all eligible low PEC block(s) in the control SLC pool. An eligible block is a block with valid data. At 714, the controller performs a block swap, swapping all eligible high PEC block(s) in the host SLC host pool directly with all eligible low PEC block(s) in the control SLC pool, completing the process at 716.

Figure 8:
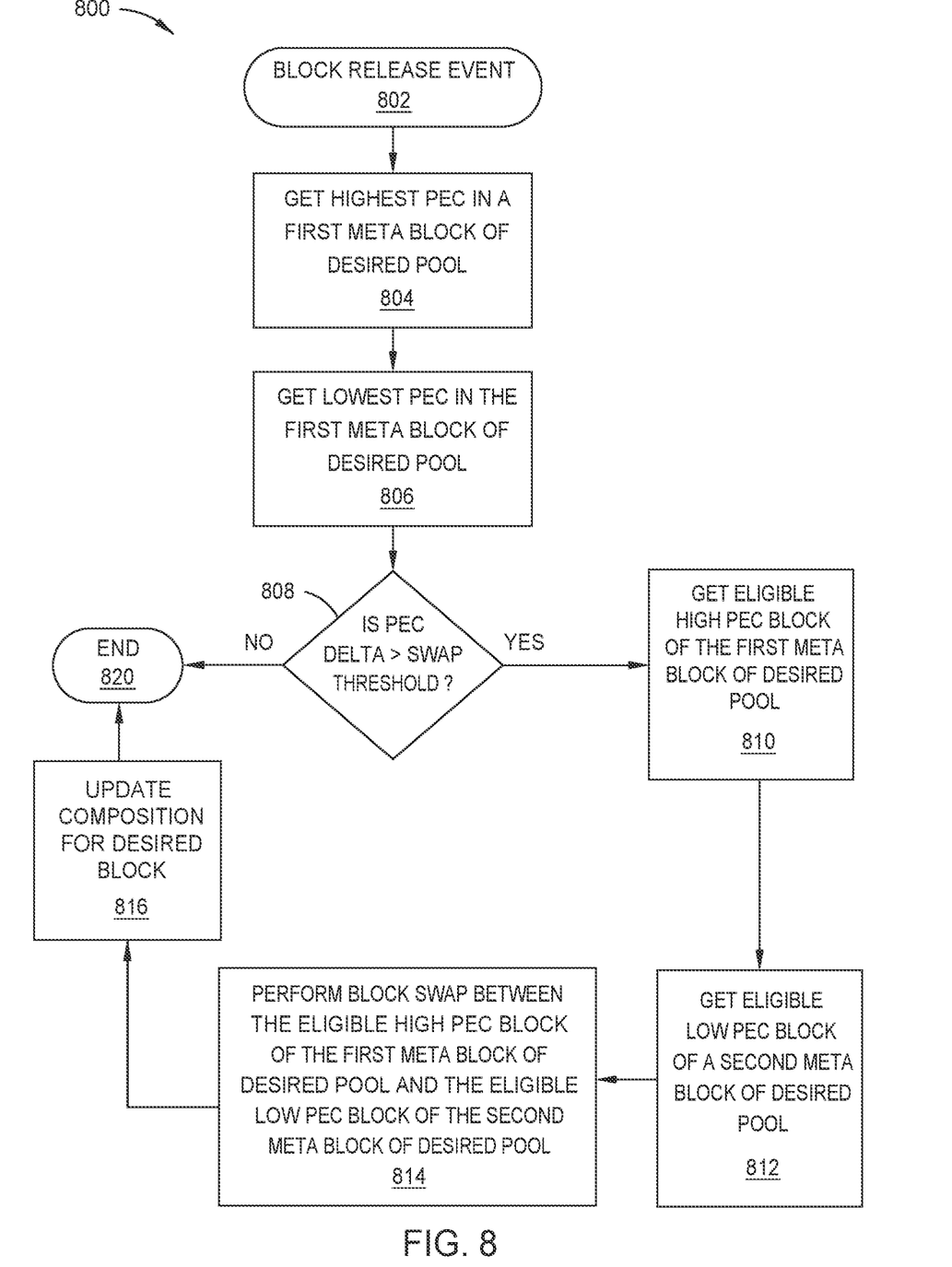
FIG. 8 is a flowchart illustrating an intra-pool swapping process according to another embodiment.

FIG. 8 is a flowchart illustrating an intra-pool swapping process according to another embodiment. The intra-pool swapping process may be performed within the host pool and/or the control pool separately. At 802, a block release event occurs. A block release event may be when a block has no valid content and released to a pool of free blocks. At 804, a controller identifies a block from a first MetaBlock of the desired pool with the highest PEC. At 806, the controller identifies a block from the first MetaBlock of the desired pool with the lowest PEC. The controller may be the controller 108 of FIG. 1. At 808, the controller determines if the PEC delta between the block having the highest PEC in the desired pool and the block having the lowest PEC in the desired pool is greater than a swap threshold. If the delta between the PEC is not greater than the swap threshold, then no swap occurs and the process ends at 820. However, if the delta between the PEC is greater than the swap threshold, at 810 the controller identifies the eligible high PEC block of the first MetaBlock of the desired pool. At 812, the controller identifies an eligible low PEC block of a second MetaBlock of the desired pool, wherein the second MetaBlock is a different MetaBlock from the first MetaBlock. The eligible low PEC block of a second MetaBlock may be a block from a FIM that different than the FIM of the eligible high PEC block of the first MetaBlock of the desired pool. At 814, the controller performs a block swap between the eligible high PEC block of the first MetaBlock of desired pool and the eligible low PEC block of the second MetaBlock of desired pool. At 816, the controller updates the composition of the desired pool, completing the process. By utilizing a swapping procedure as discussed herein when using IRMB, wear leveling in both control and host pools is reduced. IRMB is also beneficial is reducing latency in recovery from UGSD events due to copying only data that experienced a write abort rather than rewriting an entire MetaBlock.

In one embodiment, a data storage device comprises: a memory device; and a controller coupled to the memory device, the controller configured to: arrange one or more host pools comprising a first plurality of MetaBlocks, wherein each MetaBlock of the first plurality comprises at least two blocks; arrange one or more control pools comprising a second plurality of MetaBlocks, wherein each MetaBlock of the second plurality comprises at least two blocks, wherein at least one MetaBlock of the control pool is an irregular MetaBlock (IRMB); and swap one or more blocks from the control pool with one or more blocks of the host pool to create a new MetaBlock. The controller is further configured to determine that one or more thresholds is exceeded prior to the swapping. The controller is configured to determine which MetaBlock in the host pool has a highest program-erase count (PEC). The controller is configured to determine which MetaBlock in the control pool has a lowest PEC. The controller is further configured to compare a difference between the MetaBlock in the host pool having the highest PEC and the MetaBlock in the control pool having the lowest PEC. The controller is further configured to compare the difference to a threshold. The controller is configured to determine whether data in the one or more blocks of the host pool that is swapped is valid. The swapping comprises relocate data from the one or more host blocks to the one or more control blocks. Wherein after the swapping, at least two blocks of the created new MetaBlock have different program-erase counts. The swapping additionally comprises moving one or more blocks from a MetaBlock in the host pool to a different MetaBlock in the host pool. The created new MetaBlock comprises at least one block having a different program-erase count (PEC) compared to at least one other block of the created new MetaBlock. The controller is configured to detect that an ungraceful shutdown (UGSD) has occurred. The swapping is in response to detecting the UGSD.

In another embodiment, a data storage device comprises: a memory device; and a controller coupled to the memory device, the controller configured to: detect that an ungraceful shutdown (UGSD) has occurred; determine that a first irregular MetaBlock (IRMB) experienced a write abort during the UGSD, wherein less than all blocks of the first IRMB experienced the write abort; create a second IRMB, wherein the second IRMB comprises blocks that experienced the write abort and blocks that are unallocated; and create a third IRMB, wherein the third IRMB comprises remaining blocks from the first IRMB and additional unallocated blocks. The second IRMB and the third IRMB are in a control pool. The unallocated blocks and the additional unallocated blocks are disposed in a control pool. The first IRMB is in a control pool. The controller is further configured to copy data from the blocks that experienced the write abort to the additional unallocated blocks.

In another embodiment, a data storage device comprises: memory means; and a controller coupled to the memory means, the controller configured to: dynamically create irregular MetaBlocks (IRMBs) using blocks from one or more IRMBs in a control pool based upon a program-erase count (PEC) difference between a host pool and the control pool. The controller is further configured to swap all eligible PEC MetaBlocks from the control pool with eligible PEC MetaBlocks from the host pool upon exceeding a PEC threshold.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
a memory device; and
a controller coupled to the memory device, the controller configured to:
arrange a host pool comprising a first plurality of MetaBlocks, wherein each MetaBlock of the first plurality comprises at least two blocks;
arrange a control pool comprising a second plurality of MetaBlocks, wherein each MetaBlock of the second plurality comprises at least two blocks, wherein at least one MetaBlock of the control pool is an irregular MetaBlock (IRMB), wherein the IRMB comprises more than one die block from a same flash interface module (FIM); and
swap one or more blocks from the at least two blocks of a first MetaBlock of the second plurality of Metablocks in the control pool with one or more blocks of the at least two blocks of a second MetaBlock of the first plurality of Metablocks of the host pool to create a new MetaBlock.

2. The data storage device of claim 1, wherein the controller is further configured to determine that one or more thresholds is exceeded prior to the swapping.

3. The data storage device of claim 1, wherein the controller is configured to determine which MetaBlock in the host pool has a highest program-erase count (PEC).

4. The data storage device of claim 3, wherein the controller is configured to determine which MetaBlock in the control pool has a lowest PEC.

5. The data storage device of claim 4, wherein the controller is further configured to compare a difference between the MetaBlock in the host pool having the highest PEC and the MetaBlock in the control pool having the lowest PEC.

6. The data storage device of claim 5, wherein the controller is further configured to compare the difference to a threshold.

7. The data storage device of claim 1, wherein the controller is configured to determine whether data in the one or more blocks of the at least two blocks of the second MetaBlock of the first plurality of Metablocks of the host pool that is swapped is valid.

8. The data storage device of claim 1, wherein the swapping comprises relocating data from the one or more blocks of the at least two blocks of the second MetaBlock of the first plurality of Metablocks of the host pool to the one or more blocks of the at least two blocks of the first MetaBlock of the second plurality of Metablocks in the control pool.

9. The data storage device of claim 1, wherein after the swapping, at least two blocks of the created new MetaBlock have different program-erase counts.

10. The data storage device of claim 1, wherein the swapping additionally comprises moving one or more blocks from a MetaBlock in the host pool to a different MetaBlock in the host pool.

11. The data storage device of claim 10, wherein the created new MetaBlock comprises at least one block having a different program-erase count (PEC) compared to at least one other block of the created new MetaBlock.

12. The data storage device of claim 1, wherein the controller is configured to detect that an ungraceful shutdown (UGSD) has occurred.

13. The data storage device of claim 12, wherein the swapping is in response to detecting the UGSD.

14. The data storage device of claim 1, wherein the controller is further configured to determine the swap is a direct swapping process.

15. The data storage device of claim 14, wherein the controller is further configured to perform an indirect swapping process.

16. The data storage device of claim 15, wherein the indirect swapping process is performed after the direct swapping process.

17. The data storage device of claim 1, wherein the controller is further configured to perform an intra-pool swapping process.

18. The data storage device of claim 17, wherein the intra-pool swapping process is performed within the host pool and the control pool separately.

19. The data storage device of claim 17, wherein the intra-pool swapping process is performed within the host pool or the control pool separately.

20. The data storage device of claim 13, wherein during the UGSD all the blocks of the first plurality of MetaBlocks are write aborted at the same time.

* * * * *